United States Patent
Desanti et al.

(10) Patent No.: US 11,907,530 B2
(45) Date of Patent: Feb. 20, 2024

(54) SCALABLE QUALITY OF SERVICE (QOS) FOR A NONVOLATILE MEMORY EXPRESS™ ENVIRONMENT

(71) Applicant: DELL PRODUCTS L.P., Round Rock, TX (US)

(72) Inventors: Claudio Desanti, Santa Cruz, CA (US); Erik Smith, Douglas, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/705,076

(22) Filed: Mar. 25, 2022

(65) Prior Publication Data

US 2023/0305700 A1  Sep. 28, 2023

(51) Int. Cl.
*G06F 12/00* (2006.01)
*G06F 3/06* (2006.01)

(52) U.S. Cl.
CPC .......... *G06F 3/0604* (2013.01); *G06F 3/0655* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 11,601,434 B1* | 3/2023 | Hornsby | H04L 63/0428 |
| 11,714,763 B2* | 8/2023 | Li | G06F 13/1668 |
| | | | 710/5 |
| 2009/0006501 A1 | 1/2009 | Bharadwaj | |
| 2013/0304951 A1 | 11/2013 | Goel | |
| 2018/0074717 A1 | 3/2018 | Olarig | |
| 2018/0081558 A1 | 3/2018 | Ish | |
| 2018/0270119 A1 | 9/2018 | Ballapuram | |
| 2020/0065269 A1 | 2/2020 | Balasubramani | |
| 2020/0081640 A1 | 3/2020 | Enz | |
| 2020/0310657 A1* | 10/2020 | Cayton | G06F 3/067 |

(Continued)

OTHER PUBLICATIONS

S. Gugnani, X. Lu and D. K. Panda, "Analyzing, Modeling, and Provisioning QoS for NVMe SSDs," 2018 IEEE/ACM 11th International Conference on Utility and Cloud Computing (UCC), Zurich, Switzerland, 2018, pp. 247-256, doi: 10.1109/UCC.2018.00033.*

(Continued)

*Primary Examiner* — Daniel D Tsui
(74) *Attorney, Agent, or Firm* — NORTH WEBER & BAUGH LLP

(57) ABSTRACT

Centralized quality-of-service (QoS) policies administration in a storage area network (SAN) is a problem without meaningful solutions. Current implementations require explicit administration of end points, which is error-prone and not scalable. Zoning for NVMe-oF is defined as a method to specify connectivity access control information on the Discovery Controller (DC) of an NVMe-oF fabric, not as a way to specify QoS policies. Embodiments comprise centrally specifying one or more QoS parameters as part of NVMe-oF zoning definitions maintained at an NVMe-oF DC to centrally controlled QoS parameters. Accordingly, embodiments provide mechanisms to specify QoS parameters in a centralized manner to eliminate requiring a system administrator having to perform per-connection QoS provisioning.

20 Claims, 11 Drawing Sheets

(56) References Cited

U.S. PATENT DOCUMENTS

| | | |
|---|---|---|
| 2020/0319812 A1 | 10/2020 | He |
| 2020/0409893 A1 | 12/2020 | Puttagunta |
| 2021/0028987 A1 | 1/2021 | Krivenok |
| 2021/0124695 A1 | 4/2021 | Jaiswal |
| 2022/0164120 A1* | 5/2022 | Kannan .................. G06F 3/0604 |

OTHER PUBLICATIONS

J. Biswas, J. Gupta, K. Kant, A. Pal and D. Minturn, "Provisioning Differentiated QoS for NVMe over Fabrics," 2021 IEEE 46th Conference on Local Computer Networks (LCN), Edmonton, AB, Canada, 2021, pp. 154-161, doi: 10.1109/LCN52139.2021.9524967.*

"FC and FCoE versus iSCSI—"Network-centric" versus "End-Node-centric" provisioning," [online], [Retrieved Oct. 12, 2020]. Retrieved from Internet <URL:https://brasstacksblog.typepad.com/brass-tacks/2012/02/fc-and-fcoe-versus-iscsi-network-centric-versus-end-node-centric-provisioning.html> (6pgs).

"NVMe over Fabrics' Discovery problem," [online], [Retrieved Oct. 12, 2020] Retrieved from Internet <URL:https://brasstacksblog.typepad.com/brass-tacks/2017/12/nvme-over-fabrics-discovery-problem.html> (2pgs).

"Hard zoning versus soft zoning in a FC/FCoE San," [online], [Retrieved Oct. 12, 2020] Retrieved from Internet <URL: https://brasstacksblog.typepad.com/brass-tacks/2012/01/hard-zoning-versus-soft-zoning-in-a-fcfcoe-san.html> (5pgs).

"NVM Express Over Fabrics," revision 1.0, May 31, 2016, [online], [Retrieved Oct. 12, 2020] Retrieved from Internet <URL:http://nvmexpress.org> (49pgs).

"NVM Express Over Fabrics," revision 1.1, Oct. 22, 2019, [online], [Retrieved Oct. 12, 2020] Retrieved from Internet <URL:http://nvmexpress.org> (83pgs).

"NVM Express Base Specification," revision 1.4, Jun. 10, 2019, [online], [Retrieved Oct. 12, 2020] Retrieved from Internet <URL:http://nvmexpress.org> (403pgs).

"Fibre Channel," Generic Services-7 (FC-GS-7), [online], [Retrieved Feb. 17, 2022]. Retrieved from Internet <URL:https://standards.incits.org/apps/group_public/download.php/81982/T11-2016-300v0.pdf> INCITS working draft proposed American National Standard for Information Technology, 2016. (397pgs).

* cited by examiner

SCALABLE QUALITY OF SERVICE (QOS) FOR A NONVOLATILE MEMORY EXPRESS™ ENVIRONMENT

BACKGROUND

A. Technical Field

The present disclosure relates generally to information handling systems. More particularly, the present disclosure relates to registration systems and methods for communication networks such as Storage Area Networks (SANs) that operate in non-volatile memory express over Fabric (NVMe-oF) environments.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The current specifications of NVMe-over Fabrics (NVMe-oF) over IP (Internet Protocol) do not include a scalable way to specify quality of service (QoS) parameters. One way of specifying different levels of service for data traffic in IP networks is Differentiated Services Code Point (DSCP). DSCP is a means of classifying and providing quality of service (QoS) in Layer 3 IP networks.

While DSCP may be used in NVMe-oF environments, it currently requires specifying a DSCP value for each host-to-subsystem connection. A network administrator could configure the network switches of an IP fabric to provide specific levels of service for certain subsets of the DSCP codepoints, however the DSCP value for a connection must be properly set by the source of the IP packets—that is, by the host or the subsystem. The only mechanism currently available to perform this setting is manual provisioning on a per-connection basis. Because only manual provisionally is currently the only option, a network administration must, on each host, administratively specify a DSCP codepoint per each subsystem the host can connect to, and on each subsystem, administratively specify a DSCP codepoint per each host that can connect to the subsystem.

Given that modern storage area networks (SANs) may comprise numerous hosts and subsystems, provisioning on a per-connection basis does not scale. Besides requiring a lot of manual effort, this extensive process is error-prone and may result in a number of misconfigurations.

Accordingly, it is highly desirable to find new, more efficient ways to specify QoS parameters to avoid requiring the labor-intensive and error-prone per-connection QoS provisioning process currently used.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
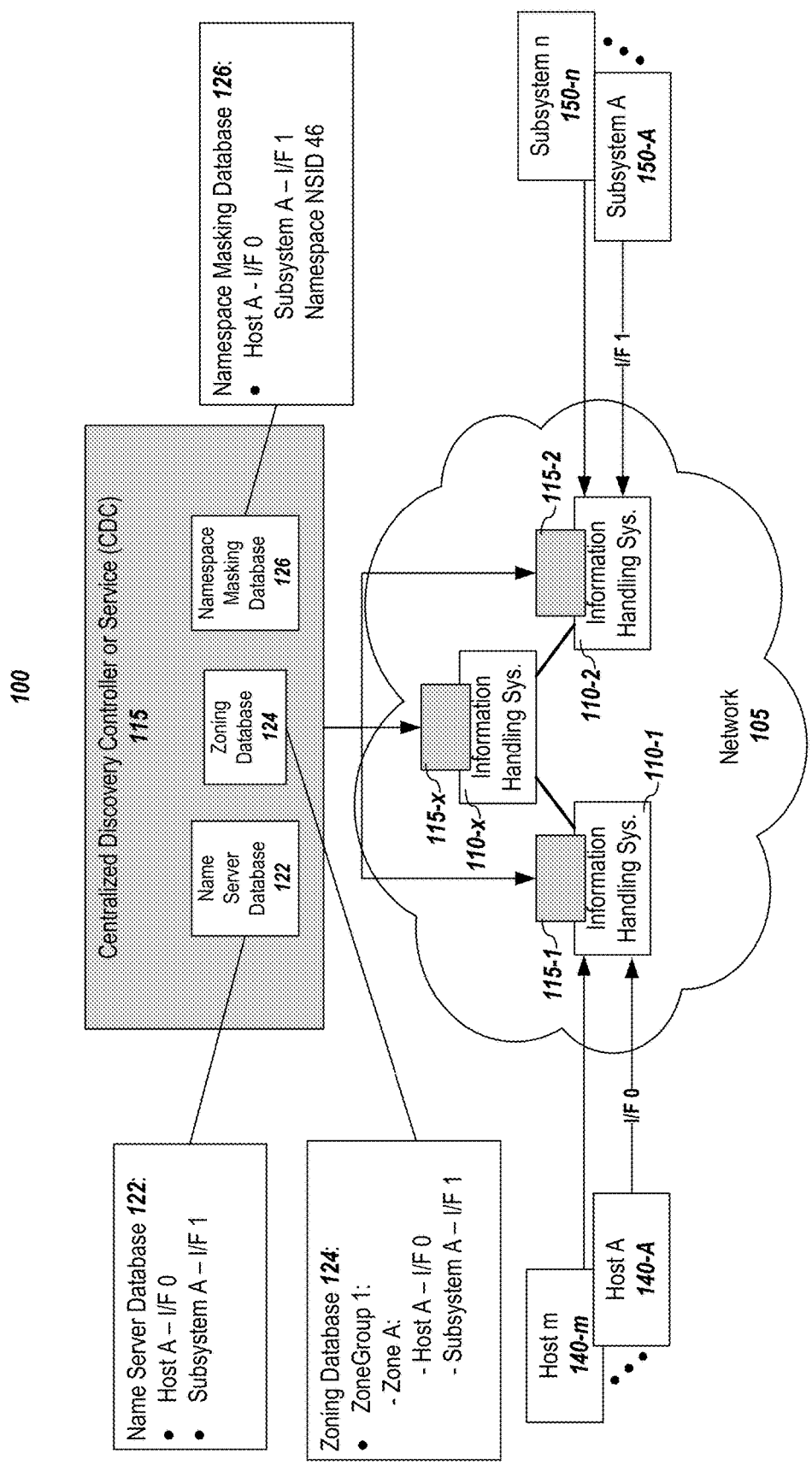
FIG. 1 depicts an example Non-Volatile Memory express over Fabric (NVMe-oF) system with a centralized discovery controller, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to a system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of providing QoS in NVMe™ environments, aspects of the present disclosure are not so limited. Accordingly, the aspects of the present disclosure may be applied or adapted for use in other contexts.

A. General Introduction

As noted in the Background section, the current specifications of NVMe-oF over IP do not include a scalable way to specify QoS parameters for a host-to-subsystem-I/O connection. Currently, manual provisioning on a per-connection basis is needed to provide QoS, which means: (1) on a host, administratively specifying a QoS value per each subsystem the host can connect to; and (2) on a subsystem, administratively specifying a QoS value per each host that can connect to the subsystem. Provisioning on a per-connection basis does not scale as it requires a lot of manual effort and tends to be error-prone. Accordingly, embodiments provide better mechanisms to specify QoS parameters in a centralized manner to eliminate requiring a system administrator having to perform per-connection QoS provisioning.

Embodiments comprise leveraging a centralized discover controller (CDC) and NVMe-oF zoning to specify one or more QoS parameters (e.g., DSCP codepoints) in a centrally controlled manner through a quality-of-service zone property in an NVMe-oF zone. Currently, zoning for NVMe-oF is used only to specify connectivity access control information on the CDC of an NVMe-oF fabric; there is neither a way to specify QoS policies nor a protocol implementation to communicate or implement the QoS policies. Accordingly, embodiments achieve effective and centralized means to implement and control QoS policies and avoid per-connection provisioning of entities in an NVMe-oF fabric. In one or more embodiments, one or more QoS properties may be assigned to a zone as part of a zone definition that is maintained by the CDC. The CDC may communicate the QoS zoning properties to the appropriate entities in the network so that they have their data traffic handled with the correct quality of service. Embodiments thereby expand the NVMe-oF zoning framework from just connectivity control to also include QoS policies administration.

B. Embodiments for Providing Quality-of-Service for NVMe-oF Zones

1. Example NVMe-oF Network Embodiments

FIG. 1 depicts an example Non-Volatile Memory Express™ over Fabric (NVMe-oF) system 100 with a centralized discovery controller 115, according to embodiments of the present disclosure. The NVMe-oF network 105 comprises a number of NVMe™ entities—an NVMe™ entity shall be understood to mean an NVMe™ host 140-$x$ or NVM subsystem 150-$x$ or any of their elements (i.e., an element of an NVMe™ entity may refer to an entire device or component (e.g., such as an NVMe™ host or an NVM subsystem) or may refer to a subset or subcomponent (e.g., an interface, a port, an agent, or a controller of an NVMe™ host or an NVM subsystem). As illustrated, the host systems 140-$x$ are connected to a network 105, and a number of NVM subsystems 150-$x$ are also connected to the network 105.

In one or more embodiments, the network 105 comprises a fabric of information handling systems 110-$x$. One or more information handling systems 110 may comprise a centralized discovery controller or service 115, which may be referred to herein as a CDC or discovery controller (DC). As illustrated in FIG. 1, the CDC 115 may comprise three databases—a name server database 122, a zoning database 124, and a namespace masking database 126.

Consider host A 140-A and subsystem A 150-A, by way of illustration (it should be noted that a similar method flow may be performed with any number of hosts and any number of subsystems). In one or more embodiments, the host and storage discover the centralized discovery controller or service 115 and register their information with the service. It shall be noted that discovery and registration may be performed explicitly or implicitly in any number of ways, including as part of logins, direct configuration (e.g., command line interface), multicast DNS (domain name server), an underlying protocol (such as DHCP), software-defined storage, etc. Embodiments of centralized storage fabric services, such as registration, including explicit and implicit registration, are disclosed in commonly-owned U.S. Pat. No. 11,240,308, filed on 10 Jun. 2020 and issued on 1 Feb. 2022, entitled "IMPLICIT DISCOVERY CONTROLLER REGISTRATION OF NON-VOLATILE MEMORY EXPRESS (NVMe) ELEMENTS IN AN NVMe-OVER-FABRICS (NVMe-OF)," listing Erik Smith, Joseph White, David Black, and Raja Subbiah as inventors, and in commonly-owned U.S. Pat. No. 11,163,716, filed on 16 Mar. 2020 and issued on 2 Nov. 2021, entitled "DISCOVERY CONTROLLER REGISTRATION OF NON-VOLATILE MEMORY EXPRESS (NVMe) ELEMENTS IN AN NVMe-OVER-FABRICS (NVMe-oF) SYSTEM," listing Erik Smith, Joseph White, David Black, and Raja Subbiah as inventors. Each of the aforementioned patent documents is incorporated by reference herein in its entirety.

Regardless of the underlying mechanism for discovery and registration, the CDC 115 receives information about elements attached to the network 105 and includes (or registers) their information into a name server database 122. For sake of illustration, an expanded view of the name server database 122 is shown with entries resulting from the discovery registration processes. Note that the entry shows host A—interface 0 and subsystem A—interface 1 have entries in the nameserver database.

In one or more embodiments, the CDC, which is now aware of subsystem A 150-A due to its registration in the name server database 122, sends a request to receive a listing of namespaces for subsystem A 150-A. This request may be in the form of a command such as "get namespace list." In response to the request, the subsystem A 150-A returns a listing of relevant interfaces and the namespaces that can be accessed via those interfaces. For example, in the illustrated example, the subsystem 150A returns interfaces 1 through 10 as being its interfaces and that namespace identifiers NSID 46-58 are available via those interfaces. In one or more embodiments, the returned information may also include the amount of available storage.

In one or more embodiments, an administrator may interact with the CDC 115 to define which hosts are allowed to access certain namespaces on a per subsystem interface basis. For example, an administrator may access the CDC 115 directly to configure storage access for hosts via a user interface. Note that, in embodiments, the administrator may utilize the registered information in the name server database 122 and the namespace information retrieved from storage subsystems that comprises interfaces of the storage subsystems and the namespace storages accessible via the interfaces to aid in defining the host-namespace/storage access. In one or more embodiments, the access may be defined by creating a zone entry in a zoning database 124 that identifies the host via a specified host interface is allowed to access the storage subsystem via a specified interface of the storage subsystem and by creating a namespace masking definition entry in a namespace masking database 126 that identifies the host via the specified host interface is allowed to access a namespace on the storage subsystem via the specified interface of the storage subsystem. One skilled in the art shall recognize that the network element (host or subsystem) and interface information between the zoning database and the namespace masking database is essentially the same with the exception of the addition of the namespace identifier for the namespace masking database entry. Thus, in one or more embodiments, the admin interface process to configure these entries may be combined into a single step in which both entries are created and the resultant notifications or configurations sent. In this depicted example, a zoning database entry, ZoneGroup 1, is created, which comprises a zone (i.e., Zone A) that includes Host A-I/F 0 and Subsystem A-I/F 1 as members. Similarly, in the namespace masking database, the entry indicates that Host A-I/F 0 is able to connect with Subsystem A-I/F 1, which provides access to namespace identifier NSID 46.

In one or more embodiments, the CDC, given the entry in the namespace masking database 126, sends the namespace masking information related to the namespace masking definition entry to the storage subsystem. In one or more embodiments, the CDC 115 sends the masking definition information to the subsystem A 150-A. In one or more embodiments, the masking record or masking definition information may comprise information such as the following:

Host NVMe Qualified Name (HOSTNQN)
Host Interface Transport Address (IP Address)
Host ID
Subsystem NQN (SUBNQN)
Subsystem Interface Transport Address (IP Address)
Namespaces (NSID) that the host has been granted access to The information may be pushed to the subsystem or requested by the subsystem. For example, in one or more embodiments, the CDC may push the namespace masking information to the relevant subsystem in response to creation of the namespace masking definition entry in the namespace masking database.

Alternatively, the CDC may send a notification (e.g., an asynchronous event notification (AEN)) to the relevant subsystem. Upon receipt of the AEN, the subsystem may request from the CDC the namespace masking information related to the namespace masking definition entry, which the CDC sends to the subsystem following receipt of the request.

In either event, the information sent to the storage subsystem may be used to configure the subsystem's access control policy, thereby granting access to the appropriate host(s).

Note that the host may be notified in a like manner. For example, in one or more embodiments, the CDC may send an AEN to the relevant host, which in term may send a "Get Log Page" command to obtain the subsystem information and establish a connection (e.g., via Fabric connect).

It shall be noted that these embodiments require only a single user interface to the CDC 115 in order to facilitate the provisioning. Thus, these embodiments provide a simpler, more uniform, and more efficient approach to provisioning. Furthermore, as noted previously, not all subsystems (e.g., EBOFs (Ethernet Bunch of Flash)/JBOFs (Just a Bunch of Flash)) have the capability to support their own user interface; thus, embodiments help provide configuration/provisioning support for such devices. Finally, as the number and complexity of storage systems and storage area network expand, embodiments herein provide for greater and easier scalability since provisioning can be accomplished via the centralized services regardless of the end network element, its vendor, its capabilities, or the number of such devices.

Concerning the zoning database 124, in one or more embodiments, the zoning database or datastore 124 may comprise a zone configuration datastore (ZoneDBConfig) and zone active datastore (ZoneDB Active).

In one or more embodiments, the ZoneDBConfig (not depicted) represents where non-active zone groups and/or zone aliases are configured, stored, modified, deleted, etc. A zone alias provides a means to group one or more members together and enable referencing all its members through the zone alias name.

In one or more embodiments, the ZoneDBActive represents the zone groups that are currently being enforced (i.e., are active) in the network. For purposes of illustration, assume that the depicted zone groups in zoning database 124 are the zone groups of the ZoneDBActive. It should be noted that while only one zone group with one zone is depicted in FIG. 1, the zone active database may comprise one or more zone groups; also, in one or more embodiments, a zone group may include one or more zones, members, aliases, attributes, etc. Note that, unlike typical zoning that only allows one active access control policy to be active at once, more than one zone group may be active at a time, which provides greater granularity over the active zone groups. One zone group may be removed or changed without affecting the activation state of other active zone groups. Note that, in one or more embodiments, the ZoneDBActive facilitates enforcement actions, such as log page filtering, event notifications, network-level restrictions, among other actions. The zone groups in the ZoneDBActive may be activated and enforced by the CDC in terms of filtering the discovered information provided to hosts and storage elements.

2. Zone Group Data Structure Embodiments

Figure 2:
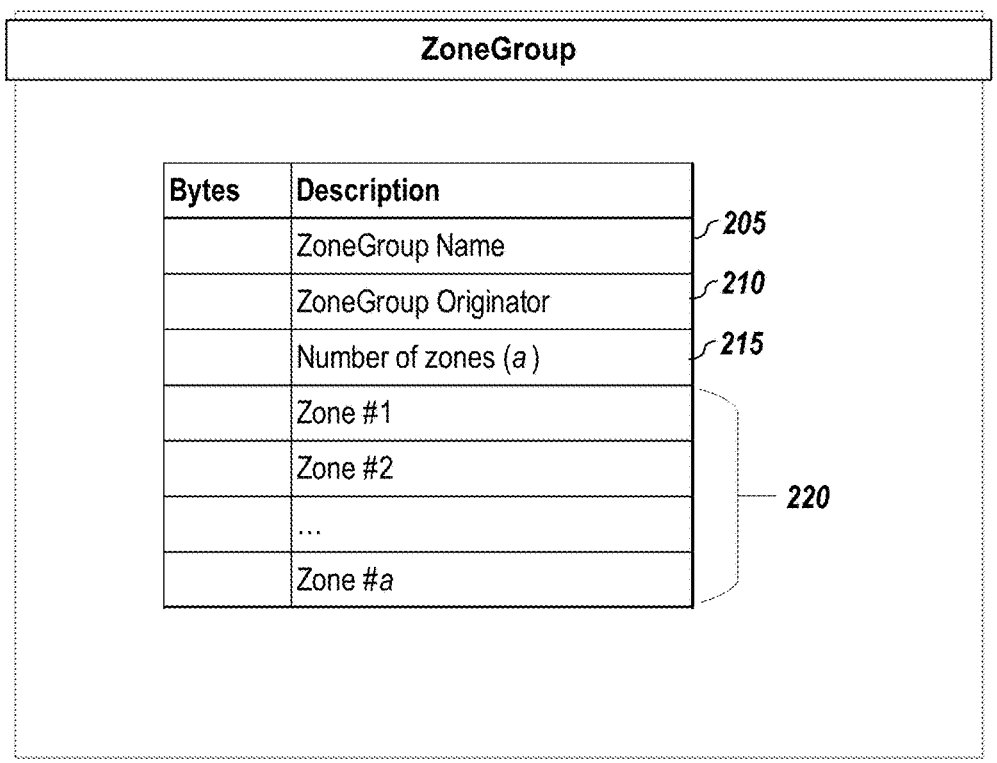
FIG. 2 depicts an example zone group dataset or data structure, according to embodiments of the present disclosure.

In one or more embodiments, a zone group is a unit of activation (i.e., a set of access control rules enforceable by the CDC). FIG. 2 depicts an example zone group 200 dataset or data structure, according to embodiments of the present disclosure. In one or more embodiments, a zone group comprises a ZoneGroup Name identifier 205 and a Zone-Group Originator identifier 210. In the depicted example, the zone group 200 includes a list of one or more zone definitions 220 that are members of the zone group and also includes an indicator 215 of how many zone definitions are in the group.

In one or more embodiments, a ZoneGroup Originator is an identifier (e.g., an NVMe Qualified Name (NQN)) of the entity that created or configured the zone group. For example, in one or more embodiments, the NQN may be the CDC's NQN, if the zone group was created/configured via the CDC; or, the NQN may be the NQN of an NVM subsystem, if the zone group was created via an NVM subsystem. It shall be noted that identifying the originator allows the system to know what entity can manage or alter an existing zone group.

In one or more embodiments, a zone group 200 may be uniquely identified by a pair, e.g., {ZoneGroup Name, ZoneGroup Originator}, and a zone identifier may be defined by the tuple {{ZoneGroup Name, ZoneGroup Originator}, Zone Name}. It should be noted that previous approaches used global naming, which could create conflicts if two zones had the same name. Thus, such a system only works well if there is a single administrator who is carefully tracking each zone name to ensure that each one is unique. However, there typically is not a single administrator, particularly for large systems, which creates an environment in which zone naming conflicts could easily occur. Unlike the global naming used by previous approaches, each zone in embodiments herein is uniquely identified by the tuple so there will not be a conflict between different zones with the same zone name belonging to different zone groups. For example, if an NVM subsystem configured a zone, Zone Alpha, in a Zone Group 1 and the CDC configures a zone, Zone Alpha, is Zone Group 2, there will not be a conflict between these two zone names because the two zone identifiers are the tuple (e.g., {ZG1, ZGO-NVM_Sub1, Alpha} vs. {ZG2, ZGO-CDC, Alpha}).

3. Zone Data Structure and Zone Member Embodiments

Figure 3:
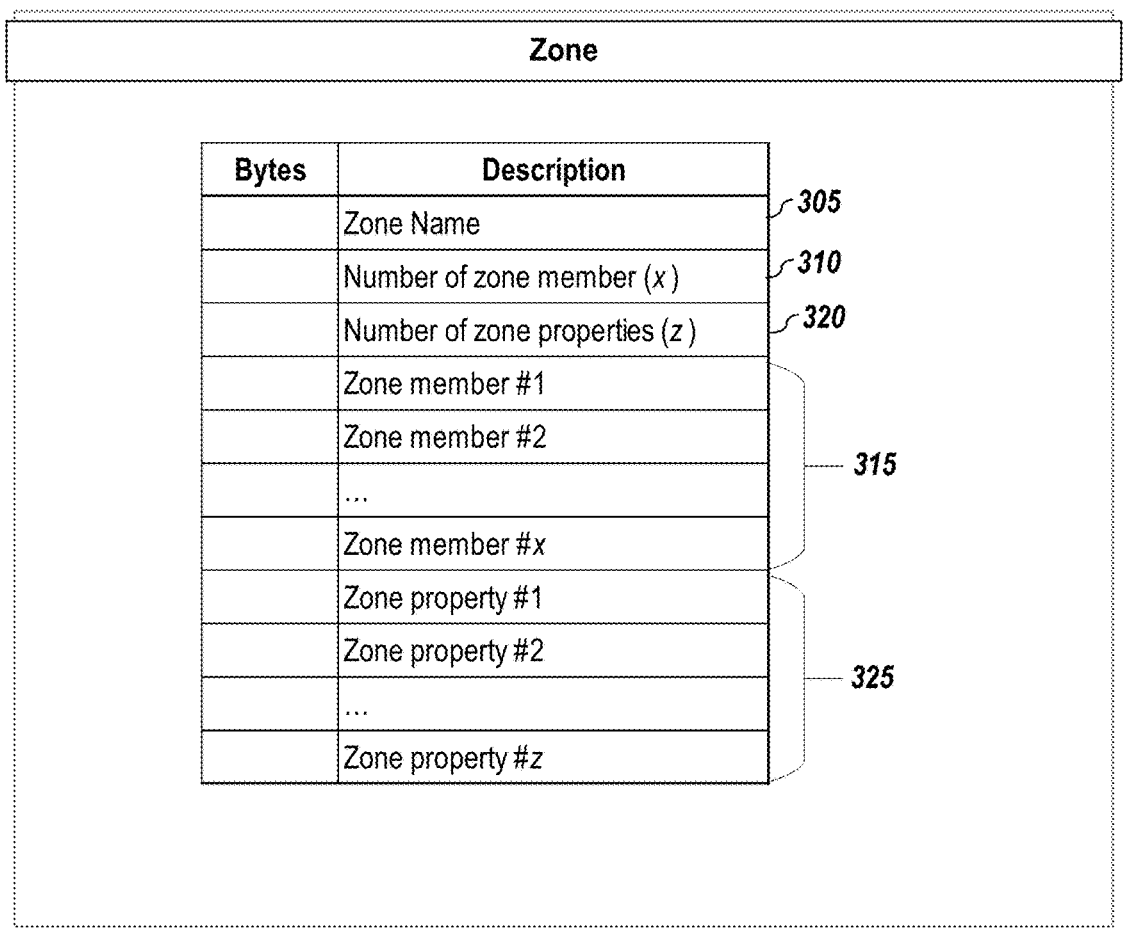
FIG. 3 depicts an example zone data set or data structure, according to embodiments of the present disclosure.

FIG. 3 depicts an example zone 300 data set or data structure, according to embodiments of the present disclosure. In one or more embodiments, the zone data of a zone may be represented by the zone data set 300. The depicted structure is of an NVMe-oF Zone that is defined as a list of zone members allowed to communicate between each other by being included in the zone definition, plus a list of optional zone properties or attributes.

In one or more embodiments, a zone data structure 300 may comprise a zone name 305, an indicator of the number of zone members 310 in the zone 300, and an identifier for each of the one or more zone members 315. In one or more embodiments, the zone data structure 300 may also include an indicator of the number of zone attributes or properties 320 in the zone 300 and an identifier for each of the one or more zone properties 325.

In one or more embodiments, a grouping of NVMe entities may be identified and referenced by a zone alias name or identifier. In one or more embodiments, a zone data structure may comprise a zone alias name, an indicator of the number of zone alias members in the zone alias, and an identifier for each of the one or more zone alias members.

In one or more embodiments, a zone member may be represented as a data set or data structure. A zone member data structure may be a type-length-value (TLV) data structure representation and may comprise the following zone member types:

- 01h—{NQN, Role}, which identifies the zone member through its NQN identifier and indicates the zone member's role (e.g., host or subsystem—note that the role is not equivalent to the device type but rather defines its function—for example, one storage device may be backed up by another storage device, which case one storage device operates in the role as a host and the other operates in the role of a subsystem). This zone member type identifies all physical ports, all IP protocols (e.g., TCP or UDP), and all IP protocol ports (e.g., TCP port 4420) that can be used by the NVMe-oF entity identified by the zone member NQN;
- 02h—{NQN+IP+Protocol, Role}, which identifies the zone member through its NQN identifier, one IP address, plus one IP protocol (e.g., TCP or UDP), and indicates the zone member's role. This zone member type identifies a specific port (through the IP address), and the specific IP protocol (e.g., TCP) used by the NVMe-oF entity identified by the zone member's NQN over that port;
- 03h—{NQN+IP+Protocol+Port, Role}, which identifies the zone member through its NQN identifier, one IP address, one IP protocol (e.g., TCP or UDP), plus one related IP protocol port number (e.g., a TCP port number), and indicates the zone member's role. This zone member type identifies a specific port (through the IP address), and the specific IP protocol (e.g., TCP) and IP protocol port (e.g., TCP port 4420) used by the NVMe-oF entity identified by the zone member's NQN over that port;
- 04h—ZoneAlias name, which identifies a zone alias, which may comprise one or more zone alias members;
- 11h—{IP+Protocol, Role}, which identifies the zone member through its IP address, plus one IP protocol (e.g., TCP or UDP), and indicates the zone member's role. This zone member type identifies the port (through the IP address) of an NVMe-oF entity, and the specific IP protocol (e.g., TCP) used by the NVMe-oF entity over that port;
- 12h—{IP+Protocol+Port, Role}, which identifies the zone member through its IP address, one IP protocol (e.g., TCP or UDP), plus a related IP protocol port number (e.g., a TCP port number), and indicates the zone member's role. This zone member type identifies the physical port (through the IP address) of an NVMe-oF entity, and the specific IP protocol (e.g., TCP) and IP protocol port (e.g., TCP port 4420) used by the NVMe-oF entity over that port;

13h—{IP_Subnet+Protocol, Role}, which identifies the zone member through one IP subnet address, plus one IP protocol (e.g., TCP or UDP), and indicates the zone member's role. This zone member type identifies the set of ports of multiple NVMe-oF entities having IP addresses belonging to the specified IP subnet, physical ports over which the identified NVMe-oF entities use the specified IP protocol (e.g., TCP); and 14h—{IP_Subnet+Protocol+Port, Role}, which identifies the zone member through one IP subnet address, one IP protocol (e.g., TCP or UDP), plus one IP protocol port number (e.g., a TCP port number), and indicates the zone member's role. This zone member type identifies the set of ports of multiple NVMe-oF entities having IP addresses belonging to the specified IP subnet, ports over which the identified NVMe-oF entities use the specified IP protocol (e.g., TCP) and IP protocol port (e.g., TCP port 4420).

In one or more embodiments, a zone alias member data (e.g., Zone alias member #1) may be represented by the zone alias member data structure. Note that for zone alias members the same or similar TLVs as used in the zone member data set may be used.

It shall be noted that fewer, more, and/or different TLVs may be used for zone members and for zone alias members.

Embodiments of zone groups, zoning, and zone management are disclosed in commonly-owned U.S. Pat. No. 11,463,521, filed on 6 Mar. 2021 and issued on 4 Oct. 2022, entitled "DYNAMIC CONNECTIVITY MANAGEMENT THROUGH ZONE GROUPS," listing Joseph White, Erik Smith, Claudio Desanti, and Pawan Singal as inventors (20110-2459), which is incorporated by reference herein in its entirety.

C. Zone Properties and QoS Embodiments

As noted above with reference to the embodiment depicted in FIG. 3, a zone comprises a list of zone members, which are allowed to communicate between or among each other by being included in the zone definition. In one or more embodiments, a zone may also include a list of optional zone properties or attributes, which may be defined as TLV (Type, Length, Value) constructs.

Accordingly, in one or more embodiments, a type in the zone property TLV structure may be used to set a quality-of-service property. For example, in one or more embodiments, a type may be allocated to define a Differentiated Service Code Point (DSCP) Zone property, having DSCP codepoints as values. For example, setting the DSCP Zone property in an NVMe-oF Zone to a certain value (e.g., 00h or having no value) may be defined to be equivalent to not having the property in the zone definition (i.e., no QoS requirements are specified), and setting the DSCP Zone property in an NVMe-oF Zone to a different value may indicate a specific DSCP codepoint/QoS level that the members of that Zone should use when communicating with each other.

Figure 4:
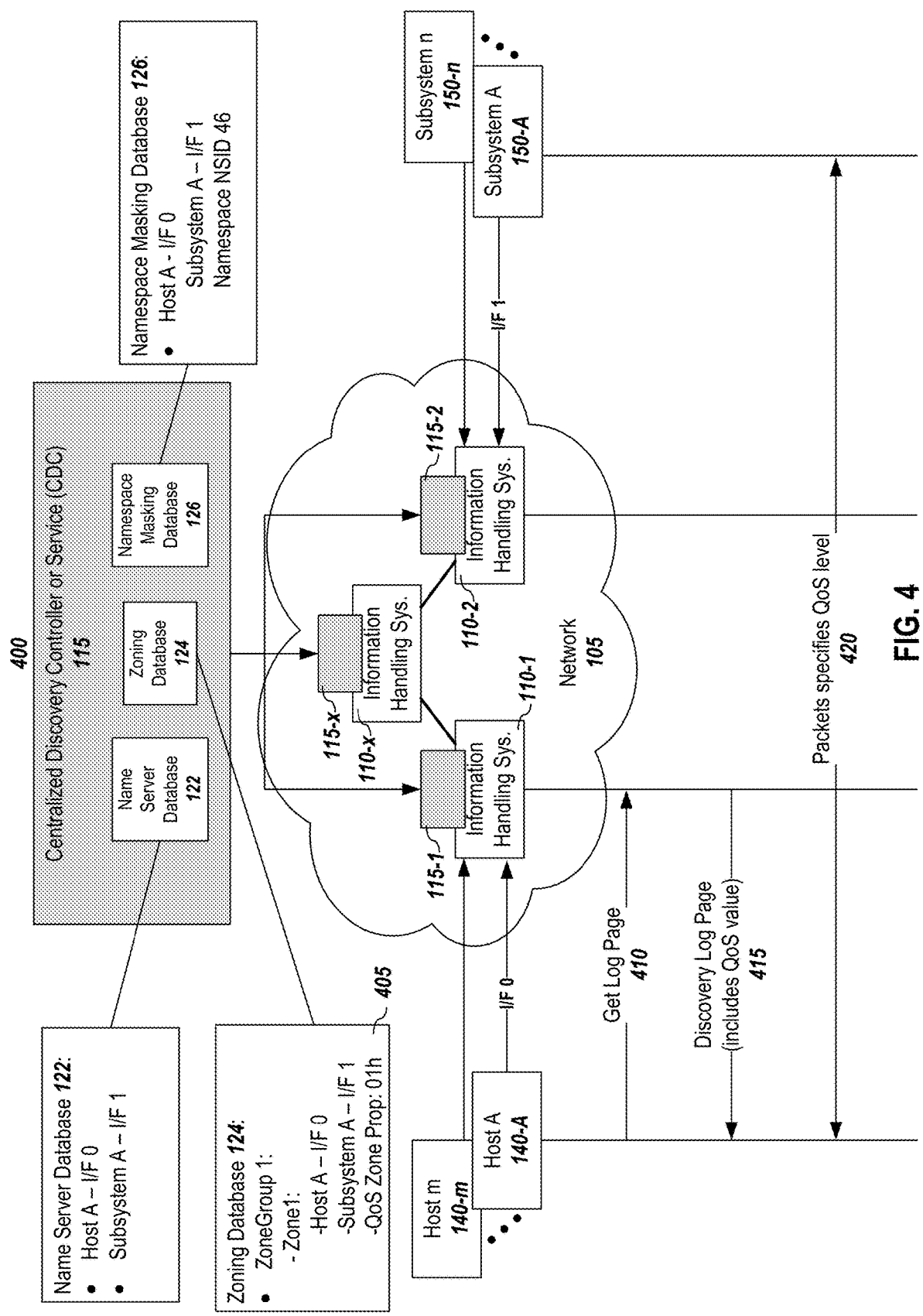
FIG. 4 depicts a method for dissemination of a quality-of-service value, according to embodiments of the present disclosure.

FIG. 4 depicts a method for implementing/disseminating a quality-of-service value, according to embodiments of the present disclosure, using, as an illustration, the network depicted in FIG. 1. In one or more embodiments, the method commences with the administrator defining the zone that includes (405) a quality-of-service property. In the depicted example the quality-of-service property is a DSCP zone property set to a value (e.g., 01h in FIG. 4) that is associated with a specific quality-of-service level. It should be noted that there may be a number of different quality-of-service levels and corresponding quality-of-service values.

In one or more embodiments, an entity, in this case, host A 140-A, issues (410) a request (e.g., Get Log Page) to the CDC 115 to discover those entities that the entity 140-A is authorized to communicate with according to the zone configuration for this entity.

In response to the request, the CDC provides (415) to the entity a list of those entities according to the zone configuration and, for at least one of the entities on the list, indicates a QoS parameter value to use when communicating with that specified entity. In one or more embodiments, to convey this information to zone members (i.e., the hosts and subsystems) a field (e.g., one-byte field) may be defined in a communication (e.g., a Log Page Entry format (e.g., in one of the available reserved fields)) to communicate the DSCP codepoint that the receiver of the Log Page Entry should use when communicating with the NVMe entity or entities described by that Log Page Entry. In this way, when a host or a subsystem issues a Get Log Page command to the CDC, it gets transport information relative respectively to the subsystems or hosts it is supposed to connect, including which DSCP codepoint to use.

As illustrated in FIG. 4, host A 140-A is allowed to establish a connection with subsystem A 150-A according to the zone definition in the zoning database 124, and when communicating, the data traffic should receive a specified QoS level as indicated by the QoS value (i.e., 01h) in the zone definition in the zoning database. Thus, in one or more embodiments, when communicating with subsystem A, host A specifies (420) the QoS value in the packets so that the data traffic receives the level of service specified in the zone definition.

Another aspect of the present disclosure is the automatic nature by which changes to QoS are propagated to the appropriate entities. For example, timely notifications to hosts and subsystems of DSCP Zone property changes may be achieved through the NVMe-oF Asynchronous Event Notification (AEN) mechanism.

Figure 5:
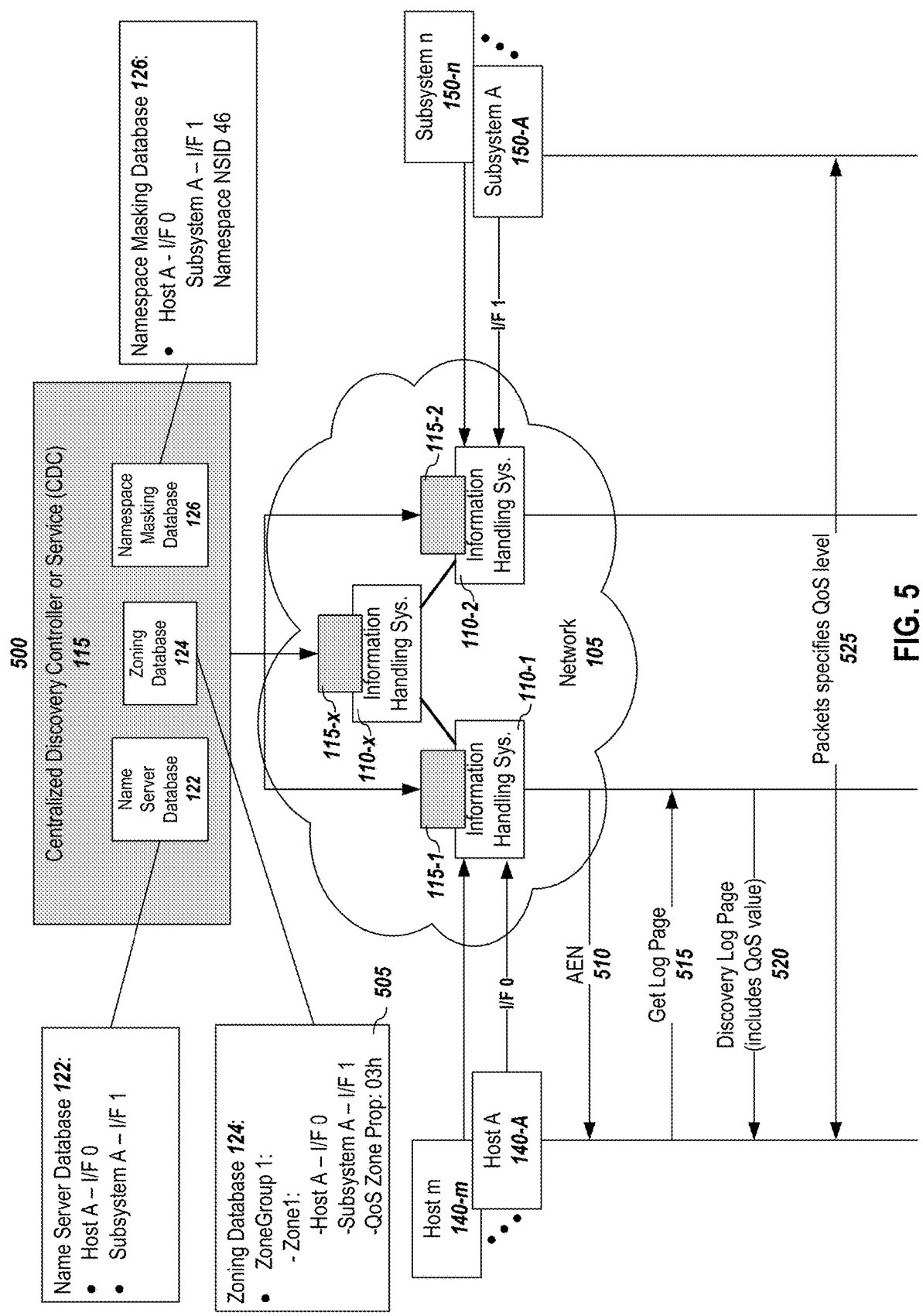
FIG. 5 depicts a method for updating a QoS level, according to embodiments of the present disclosure.

FIG. 5 depicts a method for updating a QoS level, according to embodiments of the present disclosure. In the depicted embodiment, an administrator changes 505 the QoS level zone property of a zone. As a result of the change, the CDC sends 510 a notice (e.g., an Asynchronous Event Notification (AEN)) to each zone member of the zone. Note that FIG. 5 depicts the steps relative to host A 140-A as an example of one zone member, but it shall be understood that the same or similar steps are performed for other zone members affected by the QoS property change.

After receiving the AEN, in one or more embodiments, the entity (e.g., host A 140-A) sends (515) an update request (e.g., Get Log Page) to the CDC 115. In response to the request, the CDC provides (520) to the entity an update response (e.g., a Discovery Log Page), which comprises the QoS parameter value that is to be used by the receiving entity.

It shall be noted that an administrator has flexibility in how to use the QoS zone property. For example, in one or more embodiments, to get all members of a zone to use a specific QoS level, the administrator may add a QoS value as a zone property to a zone definition (e.g., add a DSCP Zone property with a desired DSCP codepoint to the zone definition). Additionally, or alternatively, an administrator may assign a subset of the members of a zone to use a specific QoS by defining a subset zone that overlaps with a larger zone and by assigning a QoS level to the subset zone (e.g., assigning the DSCP Zone property with the desired DSCP codepoint).

Figure 6:
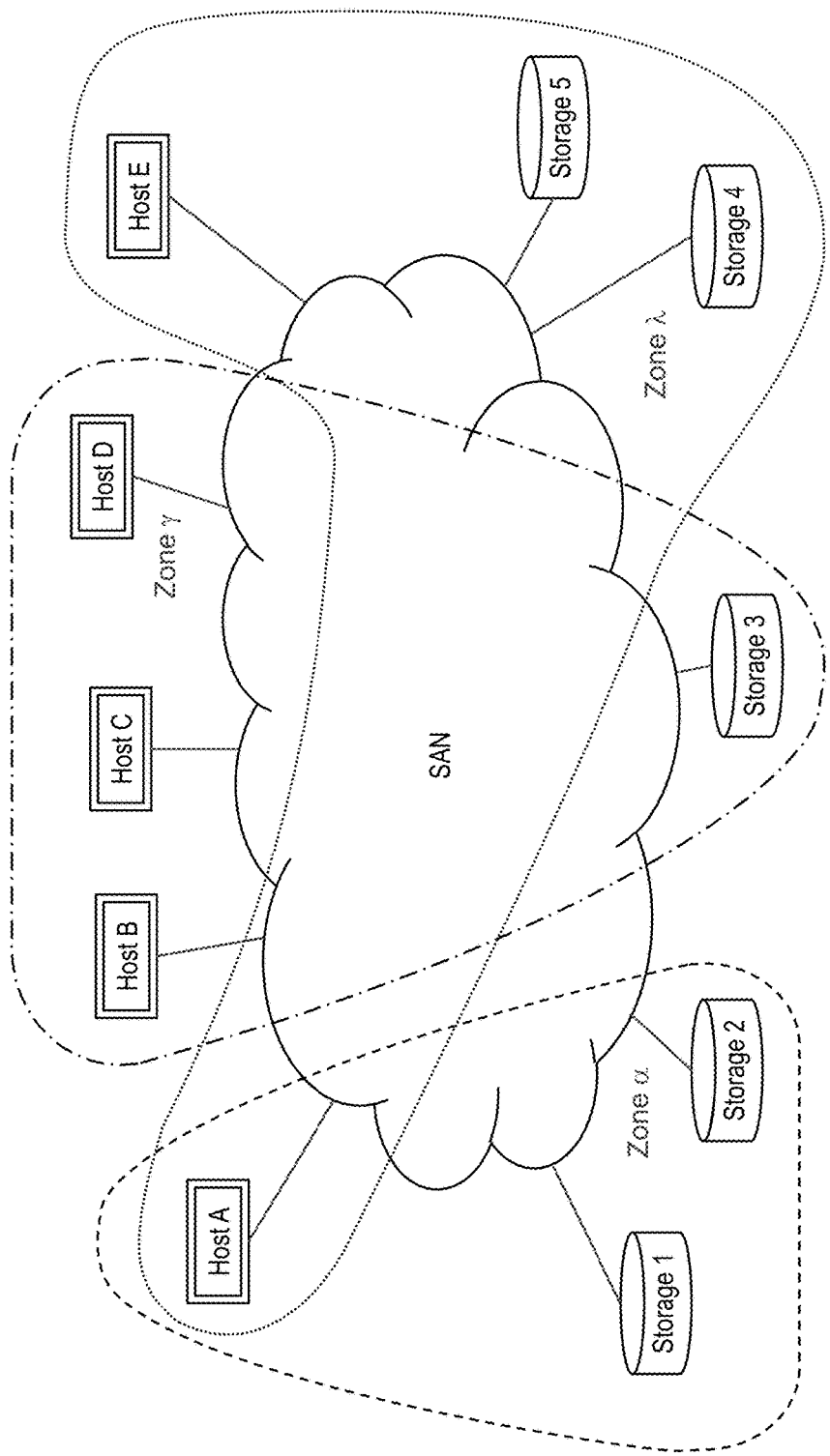
FIG. 6 graphically depicts zones of a zone group, according to embodiments of the present disclosure.

Consider by way of illustration the following example to help facilitate understanding of how a QoS/DSCP Zone property functions. Table 1 shows an example of a zone group definition with three zones, α, γ, and λ. The zones of Table 1 are graphically represented in FIG. 6.

TABLE 1

Example of Zone definitions

| | Zone Group {Rome, NQN(CDC)} | | |
|---|---|---|---|
| Zone Name | α | γ | λ |
| Zone Members | {Host A, host} {Storage 1, subsystem} {Storage 2, subsystem} | {Host B, host} {Host C, host} {Host D, host} {Storage 3, subsystem} | {Host A, host} {Host E, host} {Storage 4, subsystem} {Storage 5, subsystem} |
| Zone Attributes | None | None | None |

Figure 7:
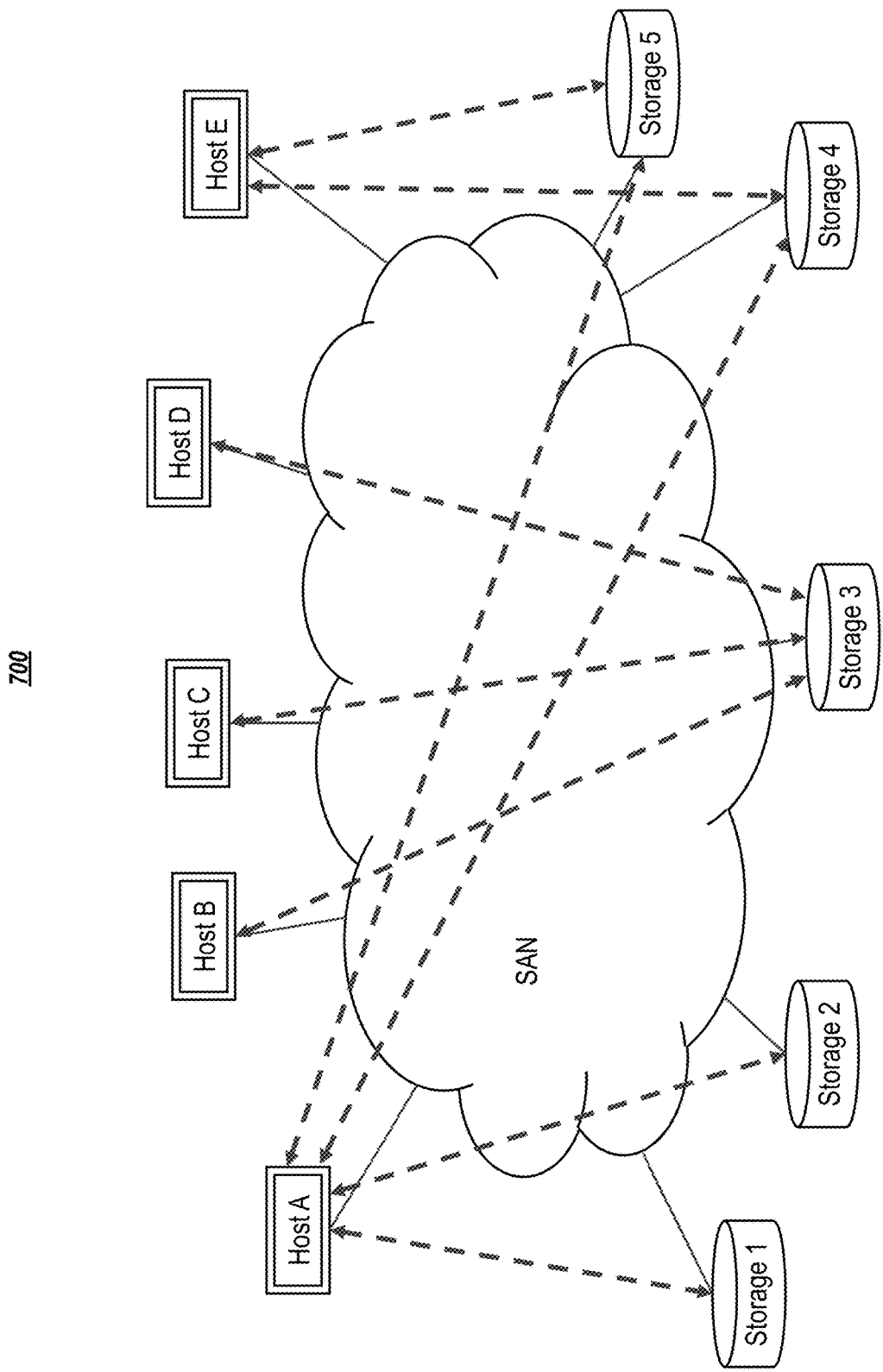
FIG. 7 graphically depicts the allowed connections between hosts and subsystems according to the zones shown in FIG. 6.

The zone configuration of Table 1 allows the connections between hosts and subsystems as graphically depicted in FIG. 7 by the dashed lines.

In one or more embodiments, not having specified any QoS/DSCP Zone attribute in the zone definition of Table 1, each of these connections may use a default DSCP codepoint (e.g., 00h). Assume for sake of this example that the administrator wants the connections defined by zone γ (i.e., the connections between hosts B, C, D, and Storage 3) to use a certain QoS level (e.g., a QoS level associated with the DSCP codepoint 02h), the administrator adds the appropriate DSCP Zone property to the zone definition, as shown in Table 2.

TABLE 2

Example of Zone definition with a QoS Level Specified

| | Zone Group {Rome, NQN(CDC)} | | |
|---|---|---|---|
| Zone Name | α | γ | λ |
| Zone Members | {Host A, host} {Storage 1, subsystem} {Storage 2, subsystem} | {Host B, host} {Host C, host} {Host D, host} {Storage 3, subsystem} | {Host A, host} {Host E, host} {Storage 4, subsystem} {Storage 5, subsystem} |
| Zone Attributes | None | DSCP Value: 02h | None |

Consider a different example using the same initial zone definition of Table 1. Assume, for sake of illustration, that the administrator desires to specify:

DSCP codepoint 01h for the connection between Host A and Storage 1;
DSCP codepoint 02h for the connection between Host C and Storage 3; and
DSCP codepoint 03h for the connection between Host E and Storage 5.

In one or more embodiments, this configuration may be achieved by creating in the ZoneDB some overlapping "subset zones" that carry the appropriate value of the DSCP property. In this example, being overlapping with the defined zones and a subset of them, these "subset zones" do not allow additional connectivity, they merely specify the DSCP properties of selected connections.

Figure 8:
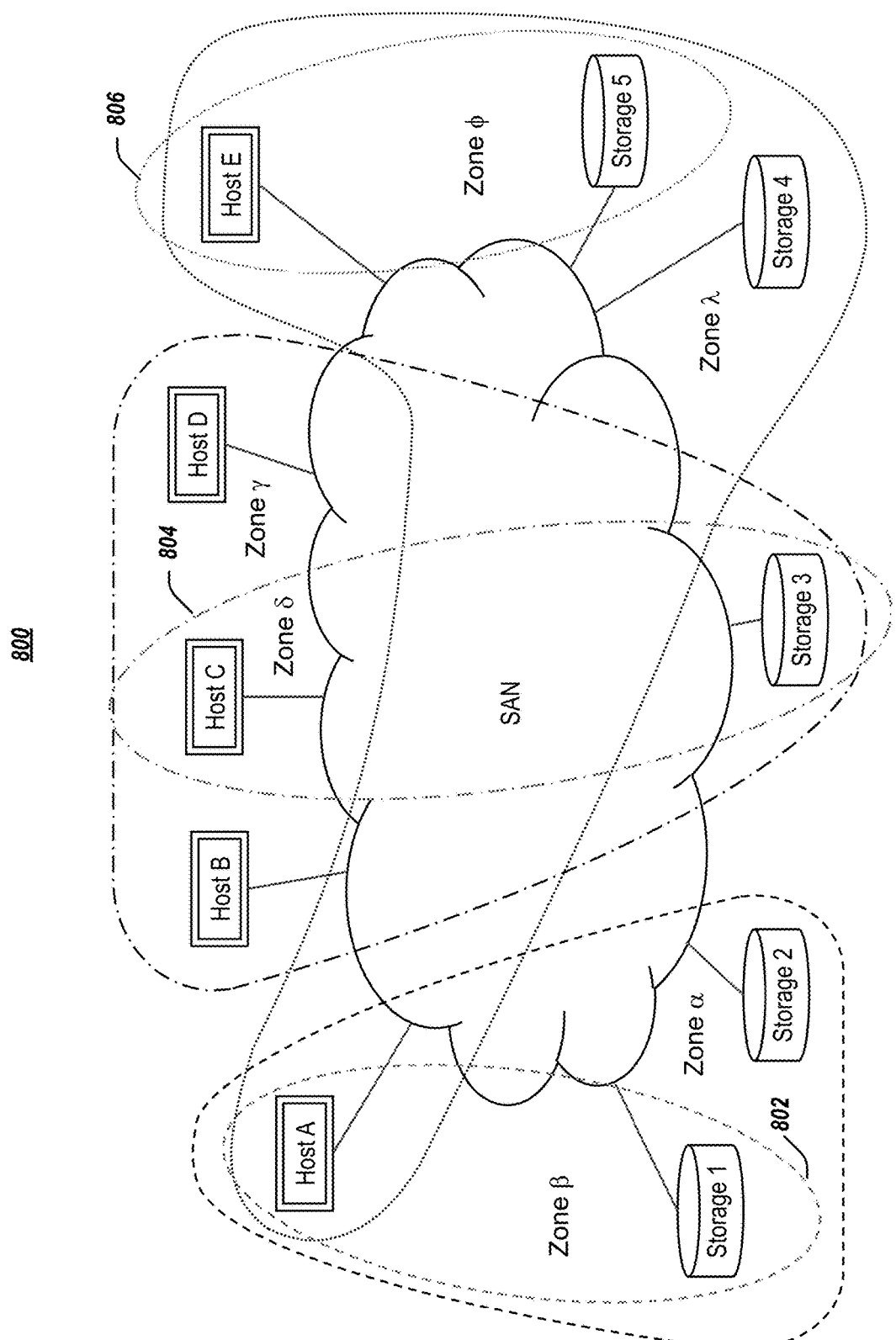
FIG. 8 graphically depicts the newly defined subset zones, according to embodiments of the present disclosure.

Table 3 shows an example of the subset zones defining the QoS specified above, expressed as a separate zone group. FIG. 8 graphically depicts the newly defined subset zones β 802, δ 804, and φ 806, according to embodiments of the present disclosure.

TABLE 3

Example of Subset Zone definitions with a QoS Levels Specified

| | Zone Group {Auth-Rome, NQN(CDC)} | | |
|---|---|---|---|
| Zone Name | β | δ | φ |
| Zone Members | {Host A, host} {Storage 1, subsystem} | {Host C, host} {Storage 3, subsystem} | {Host E, host} {Storage 5, subsystem} |
| Zone Attributes | DSCP Value: 01h | DSCP Value: 02h | DSCP Value: 03h |

In one or more embodiments, the active zoning configuration changes upon activation of the zone group "Auth-Rome" shown in Table 3, above. As a result, an AEN may be sent by the CDC to the affected hosts and subsystems (hosts A, C, and E and subsystems 1, 3, and 5 in this example). The affected entities may respond to the AEN by issuing a Get Log Page command to the CDC to ascertain what changed. In the reply Log Page sent by the CDC, the relevant DSCP codepoint value provides to the affected entities the QoS requirements specified by the administrator in the zone group "Auth-Rome". Specifically:

Host A detects that DSCP codepoint 01h is needed to connect to Storage 1;
Storage 1 detects that DSCP codepoint 01h is needed to connect to Host A;
Host C detects that DSCP codepoint 02h is needed to connect to Storage 3;
Storage 3 detects that DSCP codepoint 02h is needed to connect to Host C;
Host E detects that DSCP codepoint 03h is needed to connect to Storage 5; and
Storage 5 detects that DSCP codepoint 03h is needed to connect to Host E.

Figure 9:
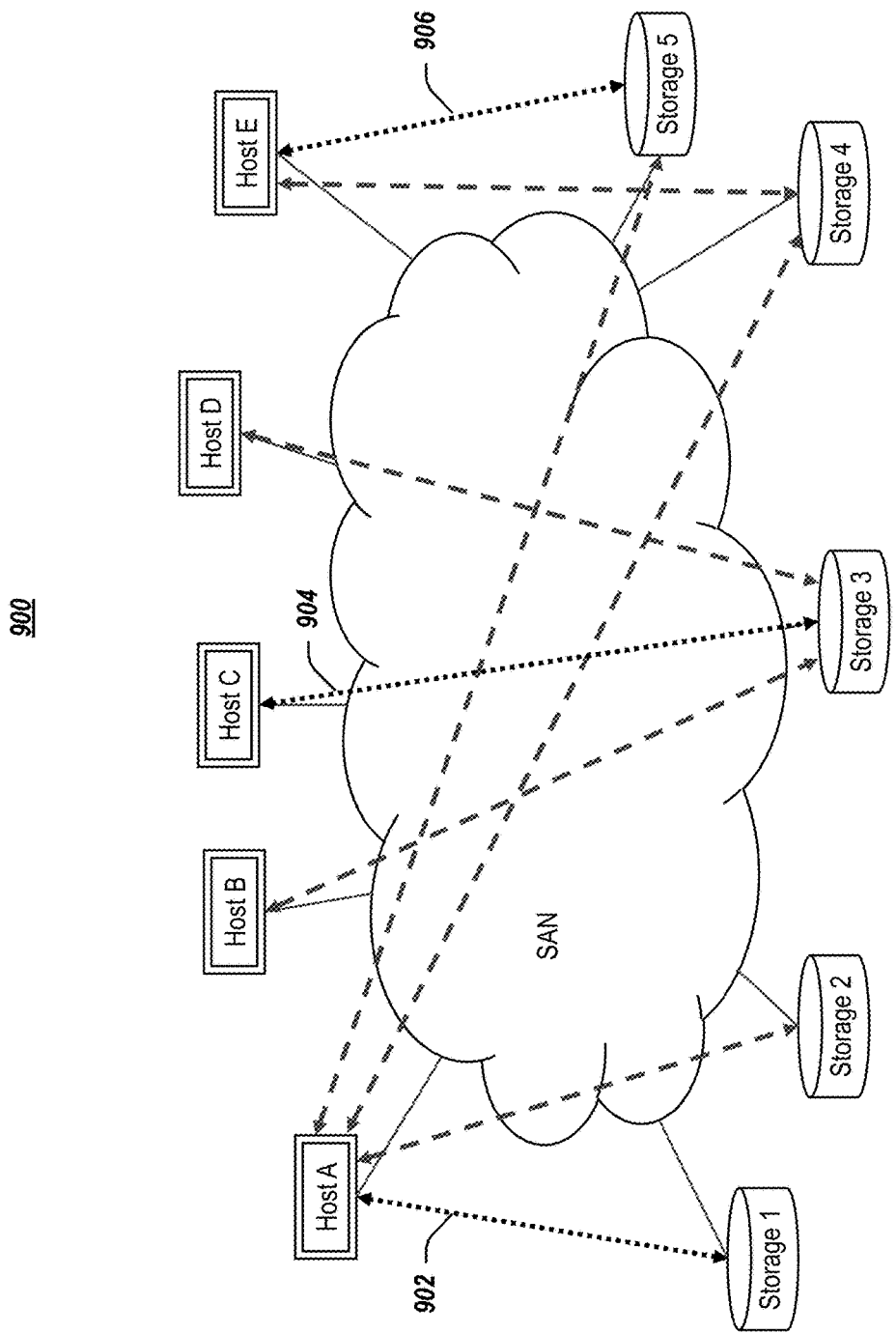
FIG. 9 graphically depicts the connections with specified QoS levels, according to embodiments of the present disclosure.

The resulting connections using a non-zero DSCP codepoint are represented by the dotted lines (lines 902, 904, and 906) as graphically represented in FIG. 9. Note that the described per-connection QoS rules are automatically derived from the NVMe-oF protocol execution—they are not per-connection rules administratively configured in each entity. In this depicted example, the main zones are not assigned a QoS level, therefore a default QoS (which default may be to apply no QoS) may be used for the other connections. In one or more embodiments, in situations in which entities are members of a first zone (e.g., a main zone) having one QoS level and are members of a second zone (e.g., a subset zone) having a different QoS level such that the QoS levels conflict, one or more rules may be used to determine which QoS level should be applied in the connection(s) between these affected entities. For example, one rule may be that the subset QoS level should be applied over the main QoS level. Alternatively, the rule may be that the last changed QoS level should be applied. In yet another embodiment, the rule may be for the entities to use the highest (or the lowest) QoS level. In another embodiment, the highest QoS level may be applied, if bandwidth or latency levels are acceptable, but if the network becomes congested, the entities may switch to the lower QoS level. It shall be noted that the rules presented above were provided by way of illustration, and fewer, more, and/or different rules may be applied.

D. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smartphone, phablet, tablet, etc.), smartwatch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read-only memory (ROM), and/or other types of memory. Additional components of the computing system may include one or more drives (e.g., hard disk drives, solid-state drives, or both), one or more network ports for communicating with external devices as well as various input and output (I/O) devices. The computing system may also include one or more buses operable to transmit communications between the various hardware components.

Figure 10:
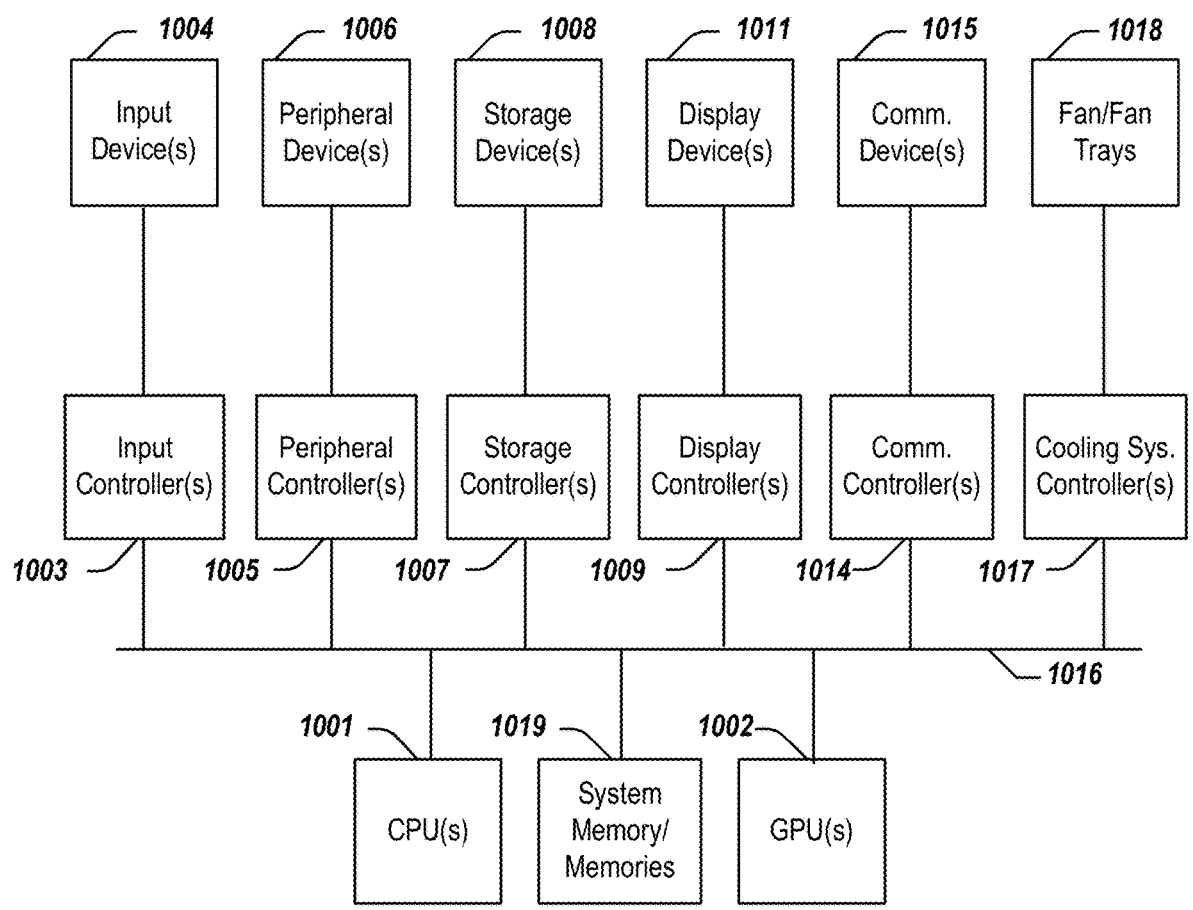
FIG. 10 depicts a simplified block diagram of an information handling system, according to embodiments of the present disclosure.

FIG. 10 depicts a simplified block diagram of an information handling system (or computing system), according to embodiments of the present disclosure. It will be understood that the functionalities shown for system 1000 may operate to support various embodiments of a computing system—although it shall be understood that a computing system may be differently configured and include different components, including having fewer or more components as depicted in FIG. 10.

As illustrated in FIG. 10, the computing system 1000 includes one or more CPUs 1001 that provide computing resources and control the computer. CPU 1001 may be implemented with a microprocessor or the like and may also include one or more graphics processing units (GPU) 1002 and/or a floating-point coprocessor for mathematical computations. In one or more embodiments, one or more GPUs 1002 may be incorporated within the display controller 1009, such as part of a graphics card or cards. The system 1000 may also include a system memory 1019, which may comprise RAM, ROM, or both.

A number of controllers and peripheral devices may also be provided, as shown in FIG. 10. An input controller 1003 represents an interface to various input device(s) 1004, such as a keyboard, mouse, touchscreen, stylus, microphone, camera, trackpad, display, etc. The computing system 1000 may also include a storage controller 1007 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the present disclosure. Storage device(s) 1008 may also be used to store processed data or data to be processed in accordance with the disclosure. The system 1000 may also include a display controller 1009 for providing an interface to a display device 1011, which may be a cathode ray tube (CRT) display, a thin film transistor (TFT) display, organic light-emitting diode, electroluminescent panel, plasma panel, or any other type of display. The computing system 1000 may also include one or more peripheral controllers or interfaces 1005 for one or more peripherals 1006. Examples of peripherals may include one or more printers, scanners, input devices, output devices, sensors, and the like. A communications controller 1014 may interface with one or more communication devices 1015, which enables the system 1000 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1000 comprises one or more fans or fan trays 1018 and a cooling subsystem controller or controllers 1017 that monitors thermal temperature(s) of the system 1000 (or components thereof) and operates the fans/fan trays 1018 to help regulate the temperature.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 11:
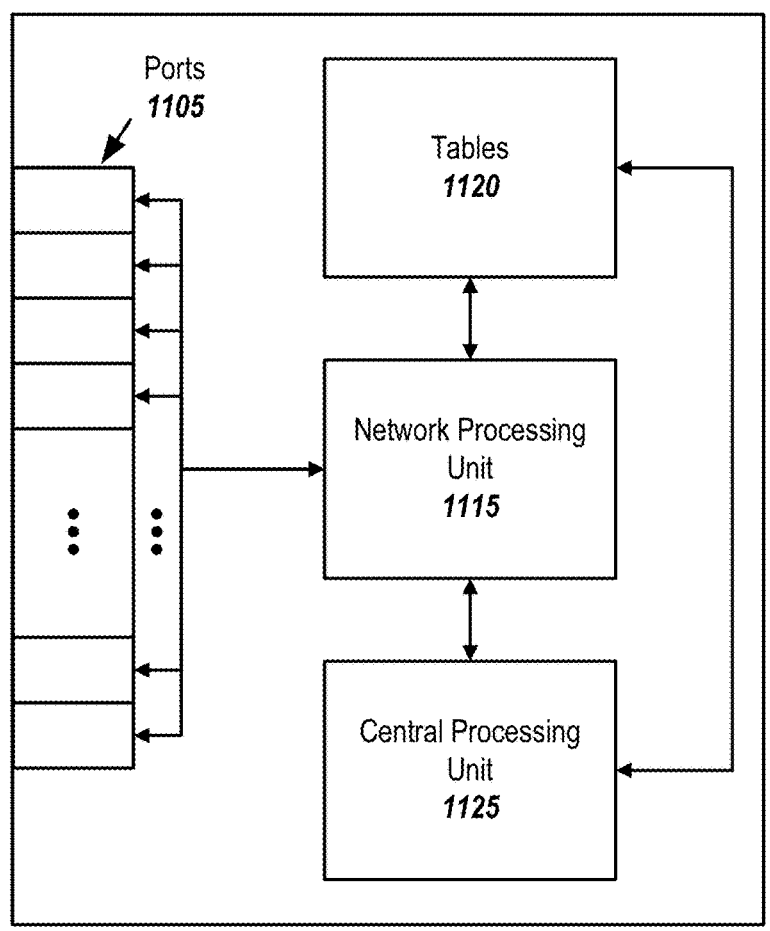
FIG. 11 depicts an alternative block diagram of an information handling system, according to embodiments of the present disclosure.

FIG. 11 depicts an alternative block diagram of an information handling system, according to embodiments of the present disclosure. It will be understood that the functionalities shown for system 1100 may operate to support various embodiments of the present disclosure—although it shall be understood that such system may be differently configured and include different components, additional components, or fewer components.

The information handling system 1100 may include a plurality of I/O ports 1105, a network processing unit (NPU) 1115, one or more tables 1120, and a CPU 1125. The system includes a power supply (not shown) and may also include other components, which are not shown for sake of simplicity.

In one or more embodiments, the I/O ports 1105 may be connected via one or more cables to one or more other network devices or clients. The network processing unit 1115 may use information included in the network data received at the node 1100, as well as information stored in the table 1120, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher-level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for providing Quality of Service (QoS) in an non-volatile memory express (NVMe™) environment, the method comprising:
   at a discovery controller (DC) in a network, which comprises entities comprising one or more hosts and one or more subsystems, receiving one or more zone configurations representing a set of access control rules that determine which of the one or more hosts are authorized to connect to which of the one or more subsystems and indicates one or more QoS parameters to use when forming these connections; and
   responsive to an entity in the network issuing a request to the DC to discover those entities that the entity is authorized to establish a connection with according to a zone configuration from the one or more zone configurations, providing to the entity:
      a list of one or more entities according to the zone configuration; and
      for at least one of the entities on the list, an indication of a QoS parameter to use for data traffic when corresponding with the at least one of the entities.

2. The computer-implemented method of claim 1, wherein the step of providing the indication of a QoS parameter to use for data traffic when corresponding with the at least one of the entities comprises:
including a value that specifies a QoS level.

3. The computer-implemented method of claim 2, wherein the value for the QoS parameter is a Differentiated Service Code Point (DSCP) value.

4. The computer-implemented method of claim 1, wherein the step of providing the indication of a QoS parameter to use for data traffic when corresponding with the at least one of the entities comprises:
responsive to the response from the DC not comprising a value that specifies a QoS level, using a default QoS level.

5. The computer-implemented method of claim 4, wherein the default QoS value comprises not applying any QoS requirement for data traffic when corresponding with the at least one of the entities.

6. The computer-implemented method of claim 1, wherein the QoS parameter is used by the entity to specify QoS level for data traffic when corresponding with the at least one of the entities, thereby implementing QoS without requiring manual per-connection provisioning of QoS level of the entity.

7. The computer-implemented method of claim 1, further comprising:
responsive to a change in the QoS parameter for the zone, sending a notice to an entity that is a member of the zone; and
responsive to receiving an update request from the entity, providing to the entity the change in the QoS parameter.

8. An information handling system comprising:
one or more processors; and
a non-transitory computer-readable medium or media comprising one or more sets of instructions which, when executed by at least one of the one or more processors, causes steps to be performed comprising:
at a discovery controller (DC) in a network, which comprises entities comprising one or more hosts and one or more subsystems, receiving one or more zone configurations representing a set of access control rules that determine which of the one or more hosts are authorized to connect to which of the one or more subsystems and indicates one or more QoS parameters to use when forming these connections; and
responsive to an entity in the network issuing a request to the DC to discover those entities that the entity is authorized to establish a connection with according to a zone configuration from the one or more zone configurations, providing to the entity:
a list of one or more entities according to the zone configuration; and
for at least one of the entities on the list, an indication of a QoS parameter to use for data traffic when corresponding with the at least one of the entities.

9. The information handling system of claim 8, wherein the step of providing the indication of a QoS parameter to use for data traffic when corresponding with the at least one of the entities comprises:
including a value that specifies a QoS level.

10. The information handling system of claim 9, wherein the value for the QoS parameter is a Differentiated Service Code Point (DSCP) value.

11. The information handling system of claim 8, wherein the step of providing the indication of a QoS parameter to use for data traffic when corresponding with the at least one of the entities comprises:
responsive to the response from the DC not comprising a value that specifies a QoS level, using a default QoS level.

12. The information handling system of claim 11, wherein the default QoS value comprises not applying any QoS requirement for data traffic when corresponding with the at least one of the entities.

13. The information handling system of claim 8, wherein the QoS parameter is used by the entity to specify QoS level for data traffic when corresponding with the at least one of the entities, thereby implementing QoS without requiring manual per-connection provisioning of QoS level of the entity.

14. The information handling system of claim 8 wherein the non-transitory computer-readable medium or media further comprises one or more sequences of instructions which, when executed by at least one of the one or more processors, causes steps to be performed comprising:
responsive to a change in the QoS parameter for the zone, sending a notice to an entity that is a member of the zone; and
responsive to receiving an update request from the entity, providing to the entity the change in the QoS parameter.

15. A computer-implemented method comprising:
issuing, from an entity of a network, which network comprises entities comprising one or more hosts and one or more subsystems, to a discovery controller (DC), which maintains one or more zone configurations representing a set of access control rules that determine which of the one or more hosts are authorized to connect to which of the one or more subsystems and indicates one or more QoS parameters to use when forming these connections, a request to discover those entities that the entity is authorized to establish a connection with according to a zone configuration from one or more zone configurations;
receiving a response from the DC comprising:
a list of one or more entities according to the zone configuration; and
for at least one of the entities on the list, an indication of a QoS parameter to use for data traffic when corresponding with the at least one of the entities; and
using the QoS parameter to specify a QoS level for data traffic when corresponding with the at least one of the entities.

16. The computer-implemented method of claim 15, wherein the QoS parameter comprises a value that specifies a QoS level.

17. The computer-implemented method of claim 16, wherein the value for the QoS parameter is a Differentiated Service Code Point (DSCP) value.

18. The computer-implemented method of claim 15, wherein the indication of a QoS parameter to use for data traffic when corresponding with the at least one of the entities is implied to be a default QoS parameter in response to the response from the DC not comprising a QoS value, using a default QoS parameter value.

19. The computer-implemented method of claim 18, wherein the default QoS parameter value comprises not applying any QoS requirement for data traffic when corresponding with the at least one of the entities.

20. The computer-implemented method of claim 15, further comprising;
    receiving a notice from the DC, in which the notice was sent in response to a change in the QoS parameter for the zone of which the entity is a member;
    issuing an update request to the DC in response to the notice; and
    receiving from the DC the change in the QoS parameter.

* * * * *